(12) United States Patent
Wieres et al.

(10) Patent No.: US 6,190,470 B1
(45) Date of Patent: *Feb. 20, 2001

(54) PROCESS FOR MANUFACTURING A HONEYCOMB BODY FROM HEAT-TREATED TWO-LAYERED OR MULTI-LAYERED METAL FOILS

(75) Inventors: Ludwig Wieres, Overath; Hans-Peter Caspar, Troisdorf; Ferdi Kurth; Günther Faust, both of Köln, all of (DE)

(73) Assignee: Emitec Gesellschaft fuer Emissionstechnologie mbH, Lohmar (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/054,371

(22) Filed: Apr. 2, 1998

Related U.S. Application Data

(63) Continuation of application No. PCT/EP96/04214, filed on Sep. 26, 1996.

(30) Foreign Application Priority Data

Oct. 2, 1995 (DE) .............................. 195 36 752

(51) Int. Cl.$^7$ ..................................... C21D 1/09
(52) U.S. Cl. .................. 148/526; 148/645; 428/607; 428/653
(58) Field of Search ................. 148/526, 645; 428/653, 607

(56) References Cited

U.S. PATENT DOCUMENTS

| 5,157,010 | 10/1992 | Maus et al. . | |
|---|---|---|---|
| 5,447,698 | * 9/1995 | Jha et al. ........................... | 148/531 |

FOREIGN PATENT DOCUMENTS

| 1 483032 | * 1/1969 | (DE) ................................... | 148/526 |
|---|---|---|---|
| 89 08 267 | 12/1989 | (DE) . | |
| 0 238 831 A1 | 9/1987 | (EP) . | |
| 0 246 660 A2 | 11/1987 | (EP) . | |
| 0 348576 A2 | 1/1990 | (EP) . | |
| 78-106053 | 11/1991 | (JP) . | |

* cited by examiner

Primary Examiner—Melvyn Andrews
(74) Attorney, Agent, or Firm—Herbert L. Lerner; Laurence A. Greenberg; Werner H. Stemer

(57) ABSTRACT

A process and a device are provided for manufacturing a honeycomb body from at least one metal foil constructed from at least two different layers, in particular from steel roll-bonded with aluminum. The metal foil is at least partly provided with a structure through the use of shaping, and is then layered or laminated or wound into honeycomb body. The metal foil is heat-treated with resistance heat generated within the foil before shaping. The heating is preferably carried out through the use of induction coils. In this way the capacity for cold shaping is increased and where required an oxide layer can be produced in a defined atmosphere. The invention reduces the energy and apparatus costs and permits economical manufacture of high-quality honeycomb bodies, in particular with microstructures increasing effectiveness.

14 Claims, 2 Drawing Sheets

PROCESS FOR MANUFACTURING A HONEYCOMB BODY FROM HEAT-TREATED TWO-LAYERED OR MULTI-LAYERED METAL FOILS

CROSS-REFERENCE TO RELATED APPLICATION

This application is a continuation of International Application PCT/EP96/04214, filed Sep. 26, 1996, which designated the United States.

BACKGROUND OF THE INVENTION

Field of the Invention

The present invention relates to a process and a device for manufacturing a honeycomb body, in particular a supporting body for catalytic converters in exhaust gas cleaning systems, as preferably fitted in motor vehicles.

The general construction of such honeycomb bodies is described, for example, in European Patent 0 454 712 B1, corresponding to U.S. Pat. No. 5,157,010. That document also describes so-called transversal microstructures, which are fitted for influencing the flow and improving the effectiveness of a catalytic converter. Honeycomb bodies are wound, laminated or layered or interlaced from at least partially structured metal sheets, wherein the structure of the metal sheets additionally results in the formation of channels through which an exhaust gas can pass. For that reason, the main structure determines the size of the channels. A microstructure is understood in the description given below, as in the prior art, to be a structure of substantially smaller dimensions than the main structure, wherein the microstructure should preferably be disposed at an angle or perpendicularly with respect to the direction of the channels in the honeycomb body. In order to manufacture a microstructure disposed in that way, it is necessary to structure a metal foil band along its longitudinal direction or at an angle with respect thereto. Considerable cold forming is necessary for such structuring, if it is to result in a continuous passage without a great degree of change in the width of the metal foil band.

Metal foils which are constructed from two or more layers and are intended for the manufacture of metallic honeycomb bodies, are known from European Patent 0 159 468 B1 and U.S. Pat. No. 5,366,139. Metal foils that are constructed in such a layered or laminated manner can be rolled from the desired alloy components, in which steel sheets roll-bonded with aluminum are preferably used. In principle it is possible to homogeneously anneal such foils after rolling, whereby a high-temperature corrosion resistant material, that is suitable in every way for the manufacture of metallic honeycomb bodies, is produced. However, that homogenous annealing is costly in terms of energy and increases the cost of the rolling process which in itself is very inexpensive.

It has also been proposed previously to manufacture honeycomb bodies from roll-bonded metal foils which have not yet been homogeneously annealed and to combine the homogeneous annealing with a brazing process that is in any case subsequently necessary. Although that variation is less expensive in terms of energy consumption, it requires that the steps which are necessary for the structuring of the metal sheets be carried out on a roll-bonded foil that is not heat-treated. It has, however, been shown that certain production steps, in particular the manufacture of microstructures, cannot be carried out without problems because of the poor capability of the roll-bonded material to be cold formed, since roll-bonded metal foils can be cold formed by no more than 1% without tearing.

Lastly, manufacturing methods for honeycomb bodies are also known in which not all of the honeycomb body is brazed at the end and thereby subjected to a heat treatment process. Thus, for example, honeycomb bodies such as are described in International Patent Application WO 89/07488 or other honeycomb bodies with involute or S-shaped metal sheets can also be joined together into a sturdy composite, in such a way that the ends can simply be welded or brazed onto a sheathed pipe, without the need to heat the metals foils in their entirety. With that manufacturing process, if the metal foils are neither homogeneously annealed or otherwise heat treated they lack a sufficiently thick oxide layer, which is desirable for the adhesion of a later catalytically active coating.

SUMMARY OF THE INVENTION

It is accordingly an object of the invention to provide a process and a device for manufacturing a honeycomb body from heat-treated two-layered or multi-layered metal foils, which overcome the hereinafore-mentioned disadvantages of the heretofore-known processes and devices of this general type and which make neither annealing at the end of a rolling process nor at the end of a process of manufacturing the honeycomb body necessary, but instead advantageously permit a heat treatment integrated with the actual manufacturing process in terms of processing technology and energy use.

With the foregoing and other objects in view there is provided, in accordance with the invention, a process for manufacturing a honeycomb body, which comprises constructing at least one metal foil from at least two different layers, in particular from steel roll-bonded with aluminum; heat-treating the metal foil by resistance heat generated within the metal foil; subsequently at least partly structuring the metal foil by shaping; and subsequently laminating, layering or winding the metal foil to form a honeycomb body.

It is important for the invention that, on one hand, the heat treatment, which does not necessarily have to be a complete homogeneous annealing, takes place before shaping of the metal foil into the honeycomb structures and where appropriate microstructures, in order to obtain sufficient capability to be cold formed for these steps. In addition, it is important that the metal foil is heated by resistance heat produced in itself. This process is very advantageous in terms of energy, since the heat losses can be kept very small. Resistance heat always occurs when an electrical current flows in the metal foil. This can be obtained by applying a voltage to the metal foil or, in accordance with another mode of the invention, by producing eddy currents through the use of induction coils. Heating through the use of resistance heat is also particularly advantageous because of the rapid heating which can be obtained thereby, which requires only a relatively short heat treatment zone without deflecting apparatus in a continuous process, and permits relatively short cycle times for the heat treatment step in a discontinuous process.

In accordance with a further mode of the invention, heating with induction coils acting on the metal foil being passed through is particularly suitable for a continuous process.

In accordance with an added mode of the invention, the application of an electrical voltage to the sections to produce a sufficiently strong current in the foil is particularly suitable for a discontinuous process on individual sections of the foil.

In accordance with an additional mode of the invention, in order to avoid uncontrolled reactions of the foil surface with the surrounding air, it is useful to carry out the heat treatment in a chamber in which a defined atmosphere is maintained.

In accordance with yet another mode of the invention, the chamber is filled with a defined atmosphere composed of inert gas, in particular of a noble gas such as argon, to which only small proportions of oxygen are added for slow, uniform oxidation of the metal foil. This is done because it is known from the literature that both excessive oxidation and the bonding of nitrides in the oxide surface are disadvantageous for the adhesion of a subsequent coating.

In accordance with yet a further mode of the invention, the partial pressure of oxygen is below that of the standard atmosphere, and preferably only a few millibars. The inert gas can be substituted with nitrogen according to the maximum temperature which the foil reaches during the heat treatment, since up to certain temperatures there is no risk of nitride formation on the surface. As already mentioned, it is not absolutely necessary to completely homogenize the metal foil since this is not necessary for the further production process, and when the honeycomb bodies are used later on, for example as exhaust gas catalytic converters in motor vehicles, homogenizing results from the calcining of a coating because of the prevailing temperatures which in any case are frequently reached, if not already during the coating process.

In the case of honeycomb bodies in which S-shaped or involute metal sheets are fixed to a sheathed pipe only at their ends through the use of joining techniques, it is advantageous for the ends to remain free of oxides because this simplifies and improves the joining process.

In accordance with yet an added mode of the invention, the sections of the metal foil surface which will later be fixed to a jacketed pipe are shielded or cooled with respect to the surrounding atmosphere during the heat treatment, so that these sections cannot oxidize. This can be carried out through the use of traveling clamps in the continuous process, wherein the foils are then subsequently cut through and laminated in the non-oxidized areas.

In accordance with yet an additional feature of the invention, in a discontinuous process the foils can firstly be cut to the lengths desired and then taken hold of at their ends with holders which also serve to conduct an electric current. The holders also cover the end sections of the sections of the metal foils and cool them, so that oxidation only takes place in the remaining area of the foil. Following this the heat-treated parts can be subjected to shaping, stacked and layered or laminated to form a honeycomb body.

With the objects of the invention in view there is also provided a device for heat treatment of a metal foil having at least two different layers, in particular steel foil roll-bonded with aluminum, the device comprising at least one metal foil transportation zone along which a metal foil having at least two different layers is conveyed; and at least one apparatus for generating resistance heat in the metal foil.

In accordance with another feature of the invention, there is provided a chamber in which the metal foil is located during heat treatment, the chamber having a defined atmosphere.

In accordance with a further feature of the invention, the defined atmosphere in the chamber is substantially formed of an inert gas, preferably nitrogen or a noble gas, in particular argon.

In accordance with an added feature of the invention, the defined atmosphere has a low partial pressure of oxygen, in particular lower than that of a standard atmosphere.

In accordance with an additional feature of the invention, the at least one apparatus for generating resistance heat in the metal foil is at least one induction coil for producing eddy currents in and thereby heating the metal foil.

In accordance with yet another feature of the invention, the at least one induction coil includes at least one induction coil disposed on each side of the metal foil transportation zone.

In accordance with yet a further feature of the invention, there is provided a compensating device disposed before and/or after the metal foil transportation zone for regulating a speed of transportation and a tensile stress acting upon the metal foil.

In accordance with yet an added feature of the invention, there are provided at least two holders for contacting a metal foil section with an electric voltage.

In accordance with yet an additional feature of the invention, the holders shield and/or cool sections of a surface of the metal foil for preventing oxidation of the metal foil at the sections of the surface.

In accordance with a concomitant feature of the invention, there is provided an initial apparatus disposed downstream of the heat treatment device for shaping the metal foil.

Other features which are considered as characteristic for the invention are set forth in the appended claims.

Although the invention is illustrated and described herein as embodied in a process and a device for manufacturing a honeycomb body from heat-treated two-layered or multi-layered metal foils, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
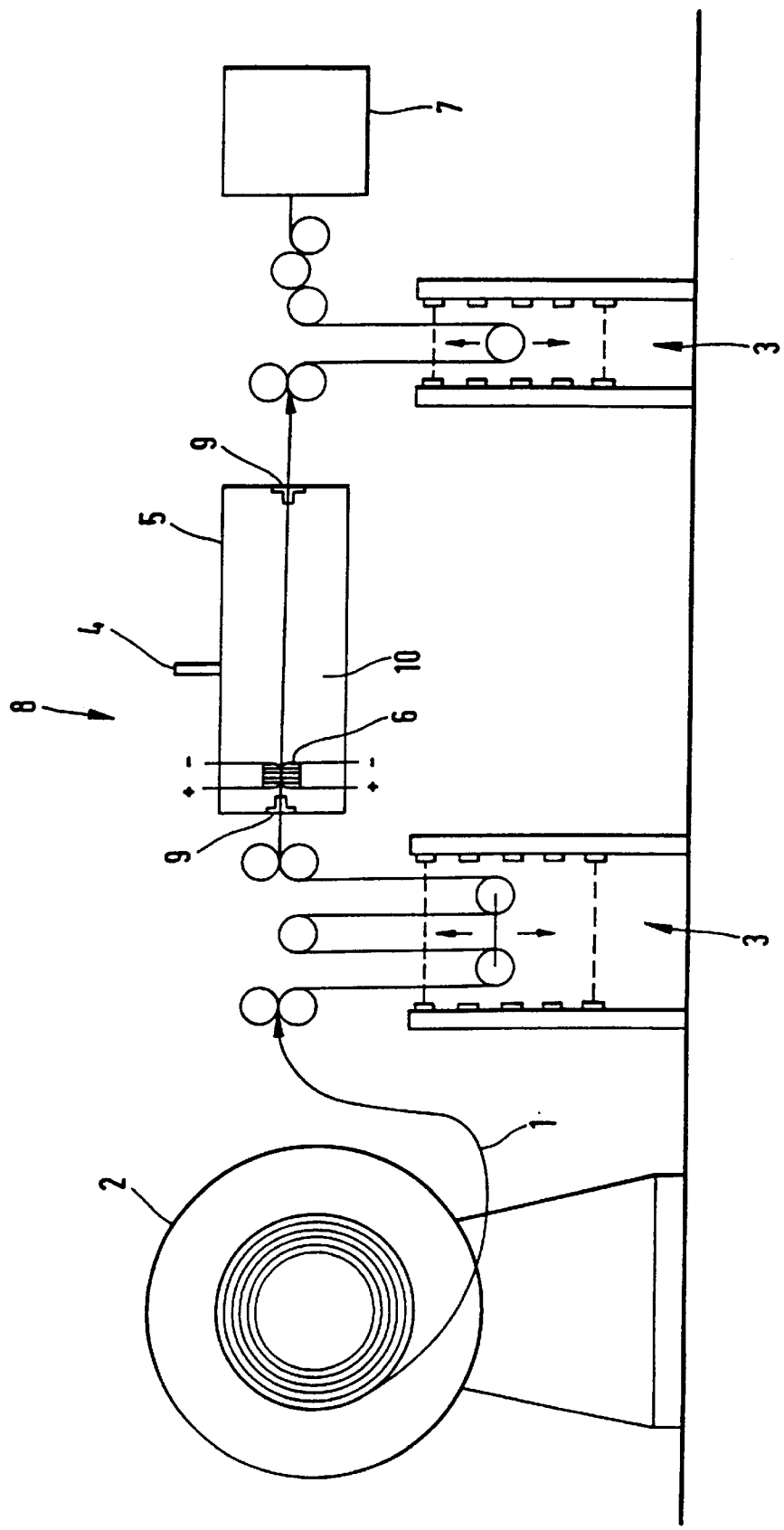
FIG. 1 is a diagrammatic, elevational view of a device for continuous heat treatment as a part of a manufacturing configuration that is not shown in more detail.

Referring now to the figures of the drawings in detail and first, particularly, to FIG. 1 thereof, there is seen a diagrammatic illustration of a first part of a device for producing honeycomb bodies from metal foil 1 constructed in a laminated or layered manner. The foil is unwound from a supply spool through the use of a foil take-up device 2. A non-illustrated transport device, for example a corrugated roller for manufacturing corrugated structures, draws the metal foil 1 from the supply spool. Before the metal foil 1 is conveyed to any shaping apparatus 7, it passes along a metal foil transportation zone 8 where, in addition to the metal foil, at least one induction coil 6, preferably two or more induction coils 6 disposed opposite one another, are disposed. The metal foil transportation zone 8 is located substantially in a chamber 5 in order to not only affect the internal properties of the metal foil 1, that is to say its capacity for being cold formed, and other chemical and physical properties, but also to specifically treat the surface. The metal foil 1 is conveyed into and out of the chamber 5, in each case through a sealing gap 9. A defined atmosphere 10, which is preferably composed of argon with a small addition of oxygen, is located in the chamber 5. The defined gas mixture is fed in through the use of a supply pipe 4, so as to compensate for losses caused by the chemical reaction and at the sealing gaps 9.

The transport of the foil cannot be carried out uniformly and without jolts due to certain mechanical properties of the feed spool and of the transportation devices. Therefore, compensating apparatuses 3 are provided before and/or after the metal foil transportation zone 8, which ensure uniform passage of the foil and a constantly approximately equal tensile stress on the foil. The induction coils 6 are disposed in such a way that they can bring the metal foil 1 passing through to a suitable temperature for the heat treatment. According to requirements, that can be a temperature of between 500 and 1000° Celsius, preferably a temperature of approximately 600°, which is just below the melting point of aluminum. In particular circumstances, a heat treatment can be carried out, for example, at 900° C., whereby a partial homogenization and rapid oxidation already take place. In principle, the temperature can be selected high enough to accelerate the oxidation so that the mechanical stability of the metal foil is just sufficient for the further transportation.

Figure 2:
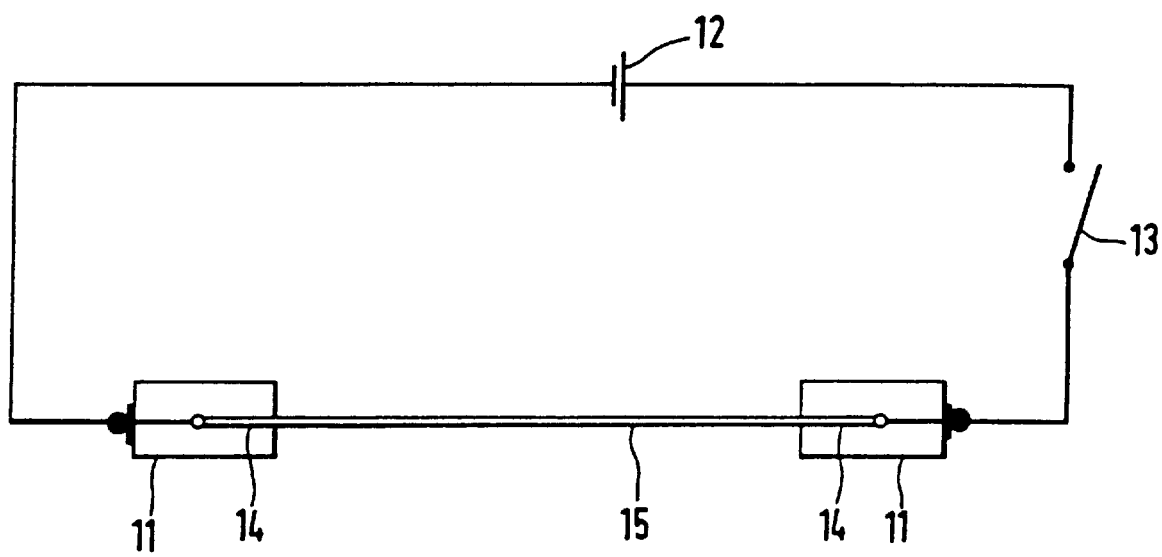
FIG. 2 is a diagrammatic and schematic representation of a heat treatment stage in a discontinuous process.

FIG. 2 diagrammatically and schematically illustrates a discontinuous heat treatment of metal foil sections 15. A metal foil section 15 is tensioned in two holders 11 which are connected to a current or voltage source 12 through the use of a switch 13. The switch 13 is closed for a predeterminable time, whereby a current flows through the foil and heats it. The holders 11 can be configured in such a way that they shield end sections 14 of the metal foil section 15 with respect to the surrounding atmosphere or at least cool the ends. In this way, no oxide layers are produced on the sections 14 which could make subsequent joining to a sheathed pipe more difficult. Naturally, the discontinuous heat treatment can also be carried out in a chamber with a defined atmosphere, in a manner completely analogous to that described with reference to FIG. 1.

It is also noted that the heating by conduction of current in the metal foil can also be carried out continuously when, for example, the holders 11 surround the moving foil and are moved along therewith.

The present invention makes possible the manufacture of honeycomb bodies from roll-bonded metal foils with cold forming of more than 1%, in particular, for example of 3% as is required for microstructures, without a complete homogenizing process, which is more expensive in terms of energy or apparatus, having to be carried out on the metal foil. It is also possible to form an oxide layer on the metal foil for improved adhesion of a subsequent catalytically active layer, so that simplified joining techniques can be used without subsequent complete heating of the whole honeycomb body.

We claim:

1. A process for manufacturing a honeycomb body in which a heat treatment and a subsequent structuring are continuously done in one production line, which comprises:
    constructing at least one metal foil from at least two different layers;
    heat-treating the metal foil by resistance heat generated within the metal foil in a defined atmosphere;
    subsequently at least partly structuring the metal foil by shaping; and
    subsequently layering or winding the metal foil to form a honeycomb body.

2. The process according to claim 1, which comprises performing the step of constructing the at least one metal foil with steel roll-bonded with aluminum.

3. The process according to claim 1, which comprises producing the resistance heat by induction.

4. The process according to claim 1, which comprises producing the resistance heat by application of an electric voltage to the metal foil.

5. The process according to claim 1, which comprises continuously carrying out the process on the metal foil and passing the metal foil on for later manufacturing steps.

6. The process according to claim 1, which comprises discontinuously carrying out the process on sections of the metal foil.

7. The process according to claim 1, which comprises carrying out the heat treatment step in a defined atmosphere.

8. The process according to claim 1, which comprises carrying out the heat treatment step in a substantially inert gas atmosphere.

9. The process according to claim 1, which comprises selecting the atmosphere from the group consisting of nitrogen and a noble gas.

10. The process according to claim 1, which comprises carrying out the heat treatment step in a defined atmosphere containing a proportion of oxygen.

11. The process according to claim 1, which comprises carrying out the heat treatment step in a defined atmosphere containing a proportion of oxygen having a partial oxygen pressure lower than in a standard atmosphere.

12. The process according to claim 1, which comprises shielding or cooling parts of a surface of the metal foil from a surrounding atmosphere during the heat treatment step to prevent oxidation.

13. The process according to claim 1, which comprises dividing the metal foil into sections having ends; and clamping the ends of the sections with holders during the heat treatment step for preventing the ends from coming into contact with the surrounding atmosphere.

14. The process according to claim 1, which comprises dividing the metal foil into sections having ends; and clamping the ends of the sections with holders during the heat treatment step while cooling with the holders to prevent the ends from heating up to a temperature sufficient for oxidation to take place.

\* \* \* \* \*